United States Patent
Chu et al.

(10) Patent No.: US 12,041,051 B2
(45) Date of Patent: Jul. 16, 2024

(54) TECHNIQUES FOR ANONYMOUS RATE LIMITING FOR SERVICES

(71) Applicant: APPLE INC., Cupertino, CA (US)

(72) Inventors: Daniel Chu, San Francisco, CA (US); Fabio Sozzani, Round Rock, TX (US); Ying Chen, Cupertino, CA (US); Betim Deva, Mountain View, CA (US); Mufaddal Y. Khumri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/085,430

(22) Filed: Dec. 20, 2022

(65) Prior Publication Data

US 2023/0396619 A1    Dec. 7, 2023

Related U.S. Application Data

(60) Provisional application No. 63/365,859, filed on Jun. 3, 2022.

(51) Int. Cl.
*H04L 9/40* (2022.01)
*H04L 9/32* (2006.01)

(52) U.S. Cl.
CPC ............ *H04L 63/10* (2013.01); *H04L 9/3213* (2013.01); *H04L 9/3247* (2013.01)

(58) Field of Classification Search
CPC ...... H04L 63/10; H04L 9/3213; H04L 9/3247
USPC ........................................................ 709/229
See application file for complete search history.

(56) References Cited

U.S. PATENT DOCUMENTS

| 2007/0076613 A1* | 4/2007 | Malhotra | ............. H04L 47/27 370/465 |
| 2018/0367306 A1* | 12/2018 | Bahety | ............. G06Q 20/3821 |
| 2020/0313867 A1* | 10/2020 | Yu | ......................... H04L 63/123 |

FOREIGN PATENT DOCUMENTS

| CN | 112235845 A | * | 1/2021 | ............. H04B 11/00 |
| CN | 112613050 A | * | 4/2021 | |
| DE | 102016207469 A1 | * | 11/2017 | |
| JP | 2016085664 A | * | 5/2016 | |
| WO | WO-2019009928 A1 | * | 1/2019 | ............. G16Y 30/10 |

* cited by examiner

*Primary Examiner* — June Sison
*Assistant Examiner* — Mariegeorges A Henry
(74) *Attorney, Agent, or Firm* — Kilpatrick Townsend & Stockton LLP

(57) ABSTRACT

A service client on a device can generate an access control identifier using a server seeded and client-specific secret. The device can generate a blinded access control identifier (ACI) using a randomness factor as part of a request message for a blinded ACI signature including authentication data. The device can transmit the request message to a verification server and upon verification receive a blinded ACI signature message that can subsequently be unblinded using the randomness factor to obtain the ACI signature. The device may send the ACI and the ACI signature to a verification server and after verifying the signature receive a service token. The device may transmit the service token to a service provider server requesting access to the service. When a rate associated with the service token is below a threshold rate, the device can access the service provided by the service provider service.

20 Claims, 9 Drawing Sheets

TECHNIQUES FOR ANONYMOUS RATE LIMITING FOR SERVICES

CROSS-REFERENCES TO RELATED APPLICATIONS

This application claims the benefit to U.S. Provisional Application No. 63/365,859, filed Jun. 3, 2022, entitled "Techniques for Anonymous Rate Limiting for Services," the disclosures which is incorporated by reference in its entirety and for all purposes.

BACKGROUND

Device identifiers can be used to access content (e.g., podcasts) and/or services from servers. The access to content and/or services can be limited to prevent fraud, such as manipulation of download statistics. For example, the download of content can be based on electronic device identifiers to prevent chart manipulation. However, the electronic device identifiers can be used to associate specific users/devices to the specific download requests resulting in privacy concerns. Previous techniques can use Internet Protocol (IP) addresses to prevent fraud. However, using IP addresses can have privacy concerns and could be defeated by using a virtual private network (VPN) or other techniques.

BRIEF SUMMARY

Certain embodiments are directed to techniques (e.g., a device, a method, a memory or non-transitory computer readable medium storing code or instructions executable by one or more processors) for access control techniques, e.g., for a network service.

In one general aspect, a method can include generating a blinded access control identifier using an access control identifier and a randomness factor derived by the electronic device. The blinded access control identifier can be encrypted. The method may include generating a request message for a blinded access control identifier signature. The request message may include the blinded access control identifier and authentication data. The method may also include transmitting the request message to a verification server. The method may include receiving a blinded access control identifier signature from the verification server following verification of the authentication data by the verification server. The method may include unblinding the blinded access control identifier signature using the client-derived randomness factor to obtain the access control identifier signature. The method may include transmitting the access control identifier and the access control identifier signature to a token server. The method may include receiving a service token from the token server following verification of the access control identifier signature using the access control identifier and a public key of the verification server. In some variations, the verification server and the token server are separate computing devices. In some variations, the verification server and the token server are software modules running on a same computing device. However, the processes described herein with respect to the verification server and the token server can be performed by any suitable combination of hardware and software components. The service token may include the access control identifier as a payload. The method may include transmitting the service token to a service provider server as part of a request to use a service of the service provider server. When a rate associated with the service token is below a threshold rate, the method may include accessing the service provided by the service provider service. Other embodiments of this aspect include corresponding computer systems, apparatus, and computer programs recorded on one or more computer storage devices, each configured to perform the actions of the methods.

In one aspect, a non-transitory computer readable medium storing a set of instructions that when executed by one or more processors of a device, cause the device to perform operations. The operations can include generating a blinded access control identifier using an access control identifier and a randomness factor derived by the computing device. The operations can include generating a request message for a blinded access control identifier signature, the request message comprising the blinded access control identifier and authentication data. The operations can include transmitting the request message to a verification server. The operations can include receiving the blinded access control identifier signature from the verification server following verification of the authentication data by the verification server. The operations can include unblinding the blinded access control identifier signature using the randomness factor to obtain an access control identifier signature. The operations can include transmitting the access control identifier and the access control identifier signature to a token server. The operations can include receiving a service token from the token server following verification of the access control identifier signature using the access control identifier and a public key of the verification server, the service token comprising the access control identifier as a payload. The operations can include transmitting the service token to a service provider server as part of a request to use a service of the service provider server. When a rate associated with the service token is below a threshold rate, the operations can include accessing the service provided by the service provider server.

A better understanding of the nature and advantages of embodiments of the present invention may be gained with reference to the following detailed description and the accompanying drawings.

DETAILED DESCRIPTION OF THE INVENTION

Figure 1:
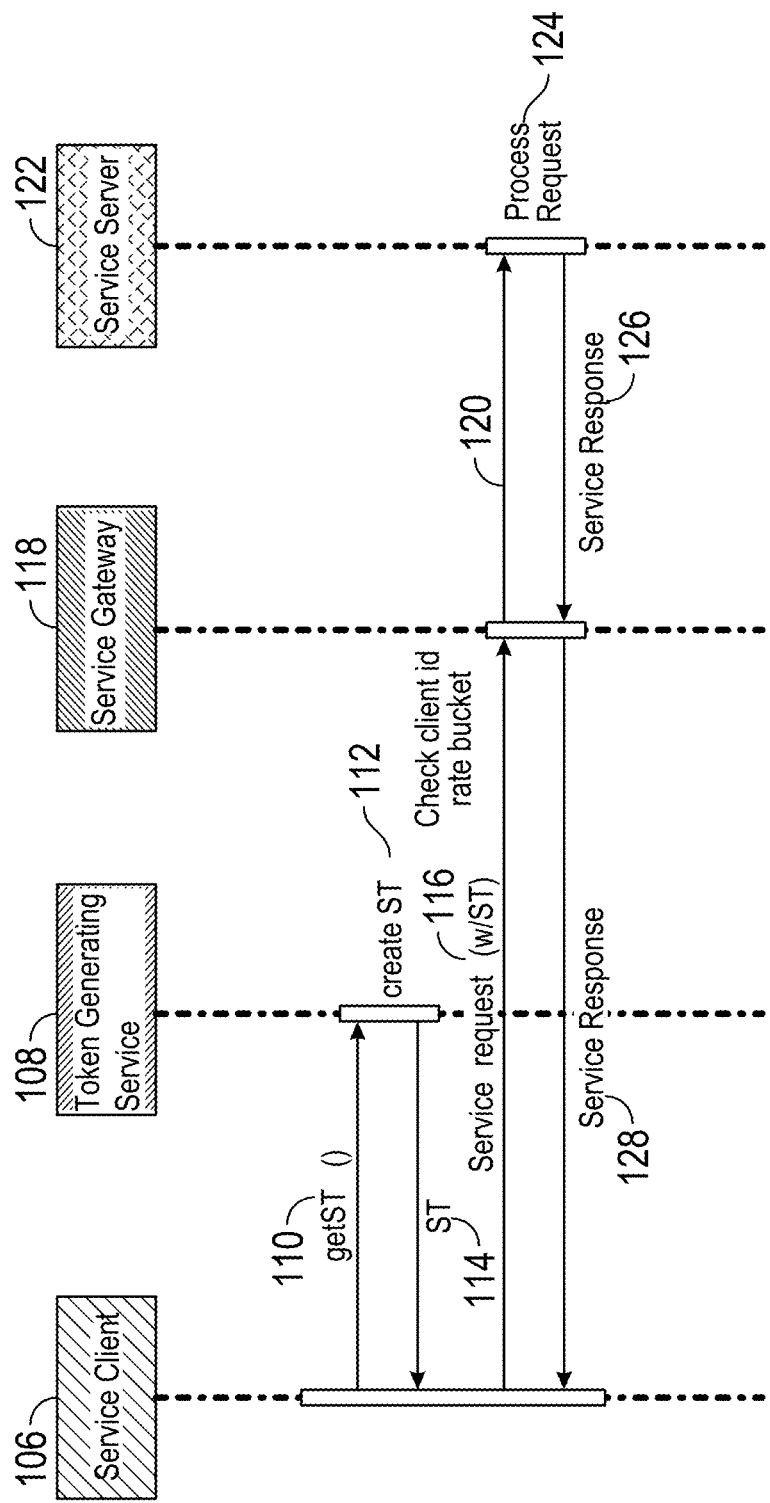
FIG. 1 illustrates a sequence diagram for a rate limiting protocol.

Certain embodiments are directed to techniques (e.g., a device, a method, a memory or non-transitory computer readable medium storing code or instructions executable by one or more processors) for discovery or ranging techniques, e.g., for a network service.

The electronic device (e.g., a smartphone, a tablet, a wearable device, a computing device) can receive an input for accessing a service (e.g., a podcast, a music service, etc.). The electronic device can generate a blinded access control identifier by blinding an access control identifier using a randomness factor. The electronic device can generate a request for a signature for the blinded access control identifier, the request comprising the blinded access control identifier and authentication data. The access control identifier can include a unique, anonymous identifier of the electronic device generated on a client side as opposed to an all-knowing server. The request can include authentication data (e.g., device identifier, such as a mobile identifier (MID), DeviceID and may include data used to perform a challenge), a public key of the electronic device, a randomness factor, and an unblinded version of the access control token. The electronic device can store the DeviceID in association with the blinded access control identifier signature. The electronic device can transmit the request message to a verification server. The verification server can be a token server.

The verification server can verify the request using a client identifier (e.g., DeviceID). The verification server could also verify the device has been able to solve the authentication challenge. The verification can be done using a private key. The verification server can generate an electronic signature for the blinded access control identifier. The verification server can transmit a blinded version of the signature to the electronic device.

The electronic device can receive the blinded signature from the verification server. The electronic device can unblind the blinded signature using the randomness factor to obtain the signature.

The electronic device can transmit the access control identifier and the signature to a token server to obtain a service token.

The token server can receive the access control identifier and the signature. The token server can verify the access control identifier using the signature and a public key of the verification server and generate a service token. The service token can include the access control identifier as a payload. The token server can transmit the service token to the electronic device.

The electronic device can receive the service token from the token server. The electronic device can transmit the service token to a server that provides the service to be accessed by the electronic device. The server can use the service token to determine whether to allow the electronic device to access the requested service.

In this manner, the service can keep track of the number of times that the token is used, but the service or the token server does not know the identify the user since the token is not associated with the specific user.

I. Use of Tokens for Service Providers

Figure 2:
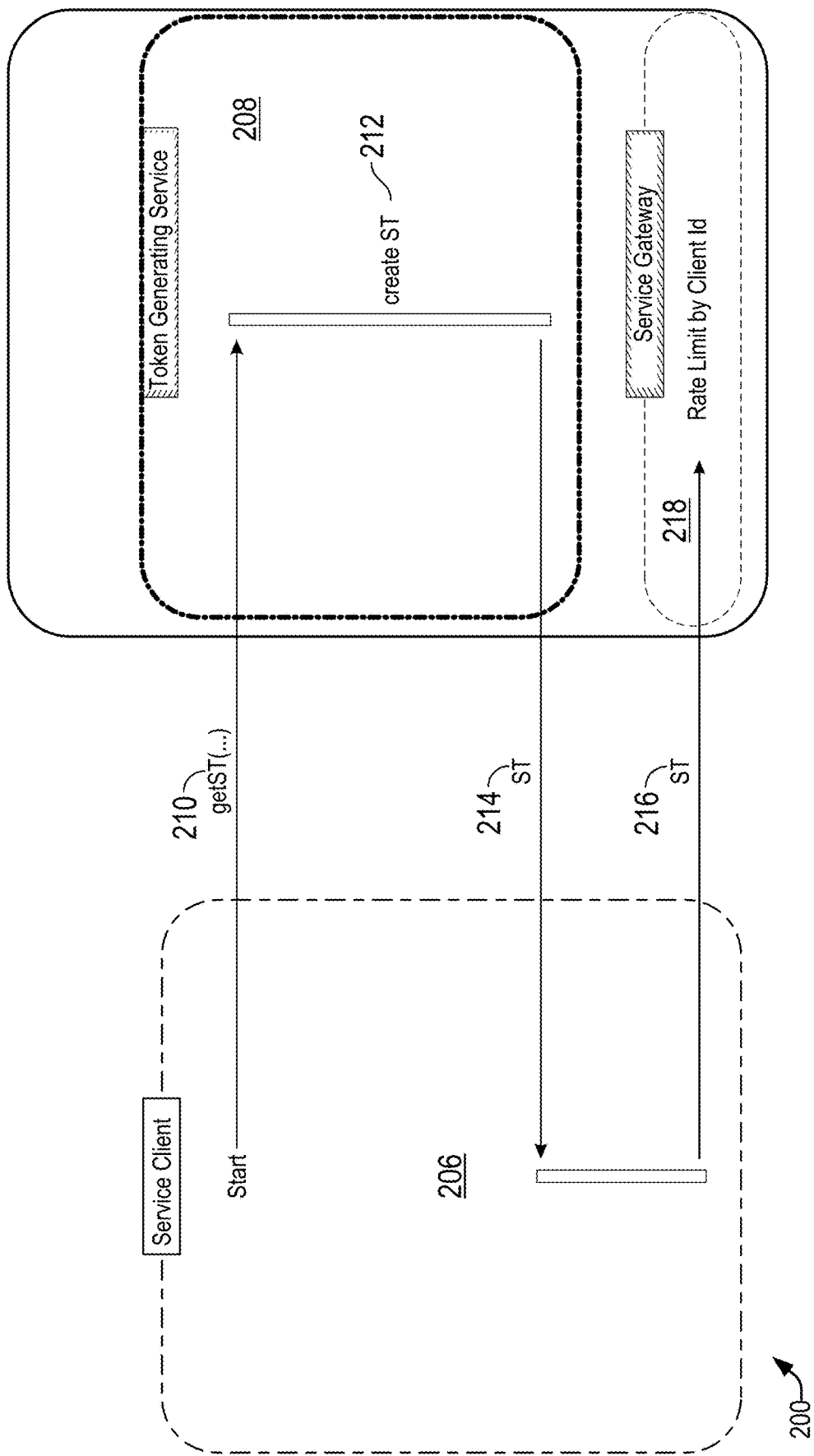
FIG. 2 illustrates a first exemplary portion of the sequence diagram for the rate limiting protocol of FIG. 1.

FIG. 1 illustrates a sequence diagram 100 for a protocol that may be improved by embodiments of the present disclosure. FIGS. 1 and 2 illustrate privacy problems in the use of service tokens for service providers. A service protocol can analyze and discover chart manipulation or fraudulent requests. In an exemplary protocol, a service client 106 (e.g., a podcast client) can request services (e.g., media services). In various embodiments, the service client 106 can include a media service that can manage media services using a specific protocol for proprietary devices. The service client 106 is not limited to media services but can be widely applied to any client-server protocol if anonymous rate limiting or access control is desired. The media services can include various services such as apps, movies, music, books, podcasts, and news. The media services can be executed on an electronic device (e.g., a smartphone, a laptop computer, a desktop computer, or a tablet computer). The service client 106 can check a memory for a service token. If the service token is not stored in the memory of the device executing the media services, the service client 106 can request one from a token generating service 108.

At 110, the service client 106 can request a service token from a token generating service. The request can include a service identifier for the service (e.g., podcast). The request can be a getST( ) (e.g., a geJWT( )) command. The request can be sent via wired or wireless means.

At 112, the token generating service 108 can create a service token (e.g., a JSON Web Token (JWT)). The service token can include the service identifier. Every request to a particular service can receive the same service token, which would not allow restriction to a particular user.

At 114, the token generating service 108 can send the service token to the service client 106.

At 116, the service client 106 can send the service request with the service token to a service gateway 118, which can validate the service token, e.g., by checking the service token against a list of one or more authorized tokens. The service gateway 118 can provide a flexible abstraction layer that securely manages communications between clients and microservices via API. The service gateway 118 can also be known as an API Gateway, API middleware or in some cases Service Mesh. The service gateway 118 can act as a gateway (or a sidecar) for microservices requests while providing load balancing, logging, authentication, rate-limiting, transformations, and more through plugins. The service gateway 118 can be tailored to the service server (e.g., a media API) or similar platforms.

In various embodiments, the service request can include a service identifier. The service identifier can be very general and will be specific only to service client (e.g., a podcast client) overall, the App. Therefore, any rate limiting that is performed would be per identifier but that can be for every single person using the service (e.g., podcast App). If a malicious user wants to do any form of fraudulent traffic, it can be challenging to detect if the system is not able to catch it because the malicious user requests can take up all of the requests (RPS) for that specific identifier and everybody else will be shut out.

The service gateway 118 can check that a rate of requests for the service to ensure that the rate does not exceed a predetermined threshold.

At 120, if the rate is below the predetermined threshold, the service gateway 118 can send the service request with the service token to the service server.

At 124, the service server 122 will process the request. The service server 122 will process the service request and generate a response to the service request. The service server 122 will send the response to the service gateway 118.

At 126-130, service server 122 can stream audio or video to service client 106. Such a service can be provided through intermediaries. For example, the service server 122 can send the service response to the service gateway 118. At 128, the service gateway 118 will send the service response to the service client 106.

In other examples, a service token can be specific to the user, but that would allow tracking of the user, which would violate privacy.

FIG. 2 illustrates a first exemplary portion 200 of the sequence diagram of FIG. 1 but using client-specific tokens. FIG. 2 focuses on the process of requesting a service token as illustrated in FIG. 1. FIG. 2 further illustrates privacy issues that may exist with this technique because the service token request is either not specific to any user or if it uses a device identifier the privacy of the user is not maintained.

At 210, the service client 206 can request a service token from a token generating service 208. The service client 206 can be the same as the service client 106 illustrated in FIG. 1. The request can include a service identifier for the requested service and a device identifier for the device. The service token can be a unique token that can be used to limit an access rate to the service. Since a device identifier is used, the user could be tracked, which may cause privacy concerns.

At 212, the token generating service 208 can create the service token (e.g., a JSON Web Token (JWT)). This service token would be specific to the current request, and thus would be specific to the particular device and user. The service token can include the service identifier. Since the service token can be a unique identifier it can be used to limit the rate of services for client devices.

At 214, the token generating service 208 can send the service token to the service client 206. The service client 206 can store the service token in a memory of the electronic device executing the service. In this way, the service token can be later retrieved from the memory to request the particular service.

At 216, the service client 206 can send a service request with the service token to a service gateway 218. The service request can be for a particular service (e.g., a podcast or a media service). The service gateway 218 can perform rate limiting for the particular client device on which service client 206 is running, as the service token includes or is associated with a particular client device identifier.

As mentioned above, the service gateway 218 can provide a flexible abstraction layer that securely manages communications between clients and microservices via API. The service gateway 218 can also be known as an API Gateway, API middleware or in some cases Service Mesh. The service gateway 218 can act as a gateway (or a sidecar) for microservices requests while providing load balancing, logging, authentication, rate-limiting, transformations, and more through plugins. In various embodiments, the service gateway 218 can be tailored to the service server or similar platforms.

II. Anonymous Rate Limiting

Various embodiments can provide rate limiting on a per device, user, or account basis, but in an anonymous manner so that privacy is not violated. An anonymous rate limiting token can be generated in response to a request from a client device, e.g., a media service running on a client device. In this way the techniques can counter manipulation of the service requests while at the same time preserving the privacy of the user's identifier or the user device identifier. As will be discussed later, the generation of the anonymous rate limiting token can be performed using blinding protocols.

Figure 3:
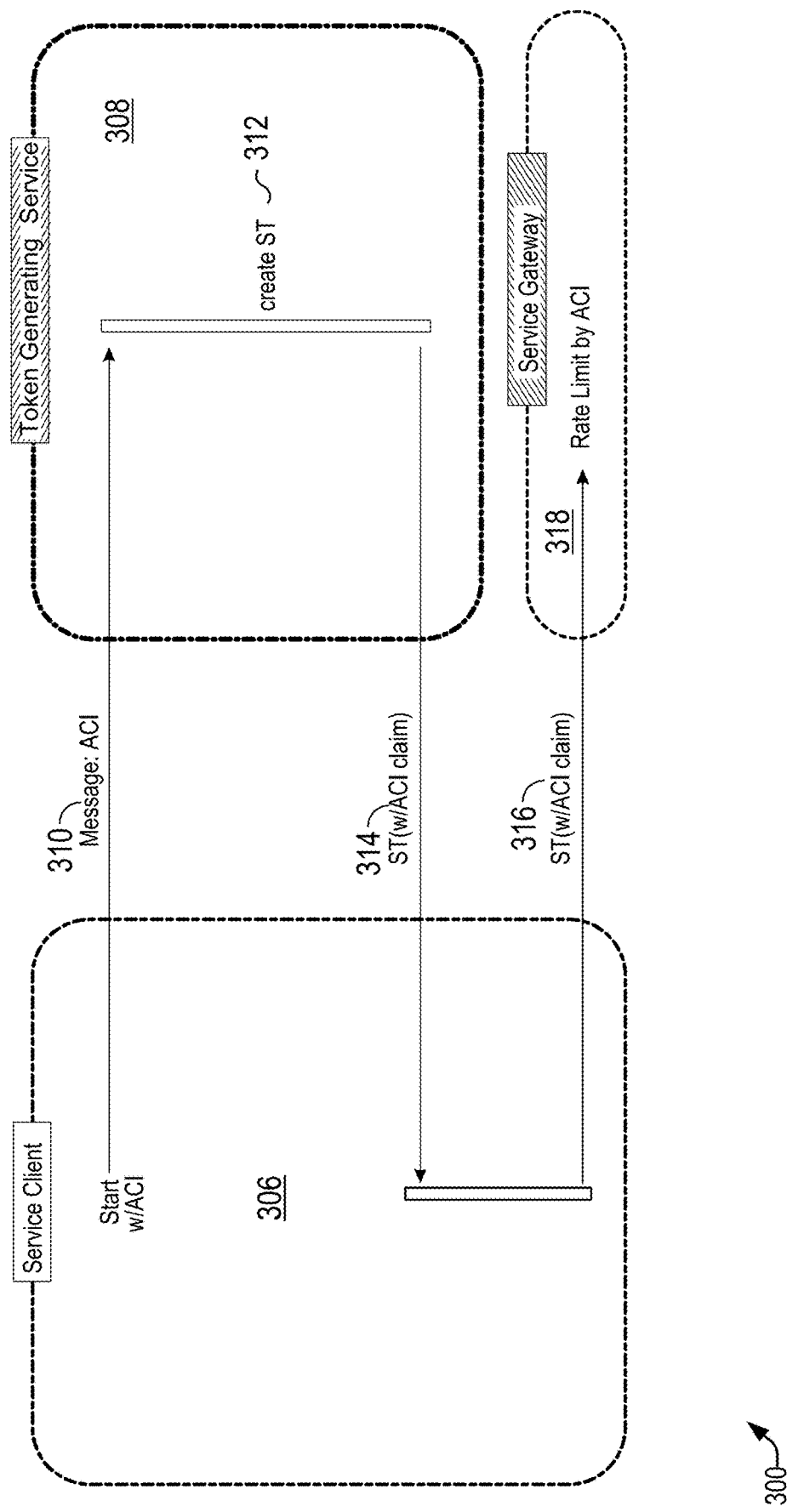
FIG. 3 illustrates a second exemplary portion of the sequence diagram for the rate limiting protocol of FIG. 1.

FIG. 3 illustrates a second exemplary sequence diagram 300 for an anonymous rate limiting protocol. Instead of using information identifying the user or electronic device to request a service token, the techniques illustrated in FIG. 3 concern generating an access control identifier. The access control identifier (ACI) can be a unique identifier. The ACI is not directly tied to the user or the electronic device. The access control identifier can be used to rate limit for a service while remaining anonymous.

A first step in the technique can be to create an identifier. This identifier can be a unique identifier that can be generated client side so that it prevents a server from knowing who is associated with the identifier.

At 310, the service client 306 can request a service token from a token server 308. The request can include an access control identifier. The request can be sent to the token generating service 308 via wired or wireless protocols. The request can be sent over a network (e.g., the Internet).

At 312, the token generating service 308 can generate a service token (e.g., a JSON Web Token (JWT)). The service token can include the ACI as a claim. The ACI can be generated client side (on a device) to prevent an "all knowing server." The ACI can prevent collisions between the requests. In various embodiments, the ACI is not in a directory services identifier (DSID) or mobile Internet device (DeviceID) list for privacy reasons. But the ACI can be used to determine a number of service requests are associated with a particular device, user, or account, e.g., for the purpose of rate limiting. However, the servers or services described herein would not know the actual identify of the devices or users making the requests.

At 314, the token generating service 308 can send the service token to the service client 306. The service token can be sent via a wired or wireless protocol. The service token can be sent via a network (e.g., the Internet). The service token can reduce collisions between the requests by using all of the inputs (e.g., random factor r, e, N).

At 316, the service client 306 can send the service request with the service token to a service gateway 318. At 318, the service gateway 318 can track a number of service requests associated with the ACI and perform rate limiting based on one or more thresholds. The service gateway 318 can provide a flexible abstraction layer that securely manages communications between clients and microservices via API. The service gateway 318 can also be known as an API Gateway, API middleware or in some cases Service Mesh. The service gateway 318 can act as a gateway (or a sidecar) for microservices requests while providing load balancing, logging, authentication, rate-limiting, transformations, and more through plugins. In various embodiments, the service gateway 318 can be tailored to the service server or similar platforms.

III. Blinding Protocols

To generate and issue an anonymous token, which may be used for rate limiting or for other purposes, various embodiments use blinding techniques. For example, an agent can provide a service to (i.e., compute a function for) a client in an encoded form without knowing either the real input or the real output. In a blind signature protocol, the signer digitally signs a message without being able to learn its content.

Figure 4:
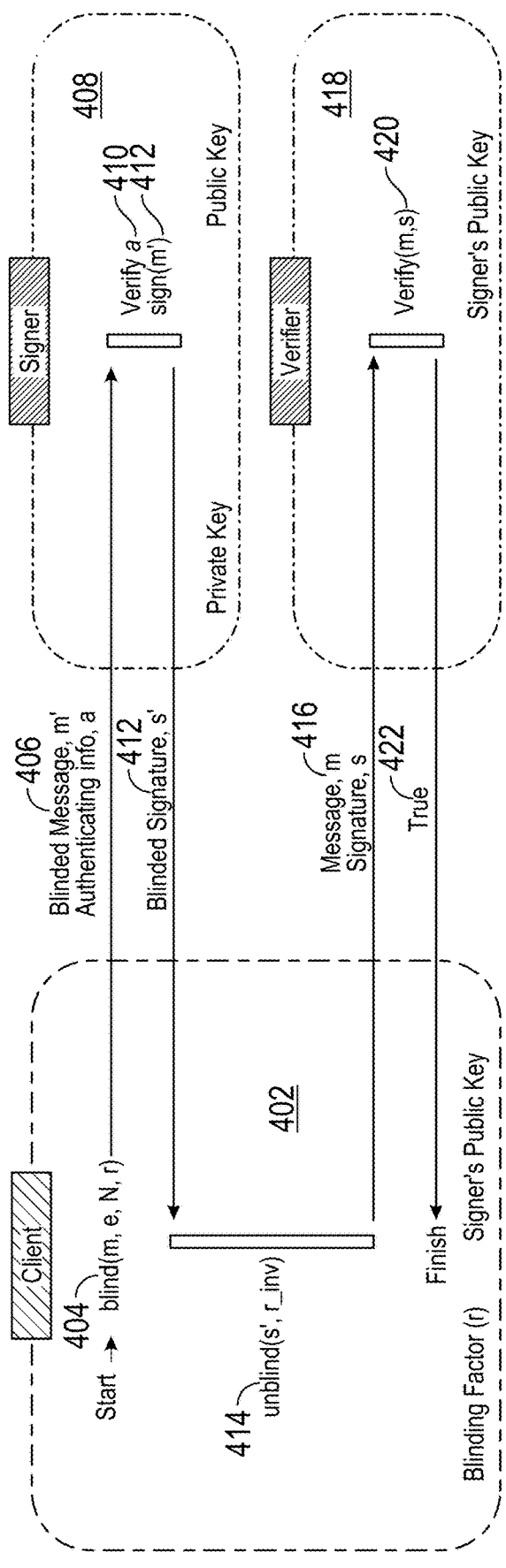
FIG. 4 illustrates an exemplary process for blinding a message.

FIG. 4 illustrates an exemplary process for blinding a message using cryptographic techniques. The following describes the steps for the exemplary process for blinding information (e.g., a message).

A service client 402 can generate a blinded version of a message. This blinding protocol can allow the system to transmit a blinded message to a signer 404 to maintain privacy when being verified.

At 404, service client 402 can blind a message using a blinding protocol. The message M can be encrypted and blinded, e.g., using an encryption public key (e and N) and blinding using a randomness factor r or cryptographic nonce. The message can be unblinded by devices holding the blinding factor. The blinded message can be the product of M, e, N, and r.

At 406, the blinded message M' and authenticating information a can be sent to a Signer 408. The blinded message M' can be sent via a wired or wireless protocol. The blinded message M' can be sent over a network (e.g., the Internet).

The Signer 408 can receive the blinded message M'. At 410, the Signer 408 can verify the authenticating information a. The verification can be performed by matching the authentication information to known data, e.g., in a database.

At 412, if the authenticating information a is verified, the signing protocol 408 can sign the blinded message M' using a signing key (which could be private key d or another private key) and send the blinded signature s' to the service client 402. If the authentication fails, the Signer 408 can return an indication that the authenticating information failed to verify (e.g., indicating a fault) or an unsigned blinded message.

At 414, the service client 402 can unblind the blinded signature s'. The service client 402 can unblind the blinded message using the randomness factor r (such inversion of the randomness is labeled r_inv) when used for unblinding. The unblinded signature can be stored in a memory of the device.

At 416, the service client 402 can send the message M and signature s to a verifier 418. At 420, the verifier 418 can receive message M that includes signature s. The verifier 418 can validate the signature s using a verification public key of the signer, which could be the signer's public key (e, N) or a different public key. There can be different keys pairs used for signing and encryption.

At 422, the verifier 418 can send back a result to the service client 402. The result can be true if the signature s is verified and false if the signature is not verified. In various embodiments, the technique can return the data that has the rate limiting token inside of it.

IV. Blinding Access Control Token Requests

Figure 5:
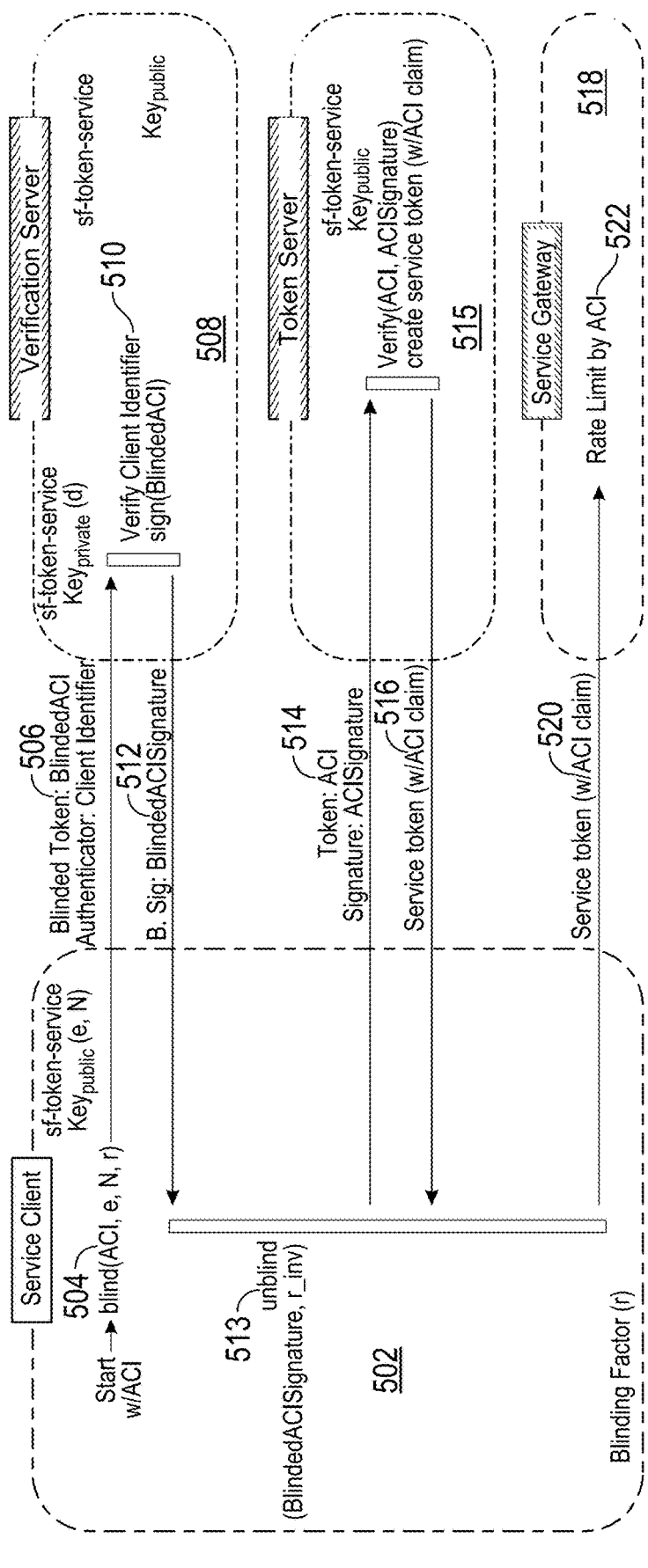
FIG. 5 illustrates a sequence diagram for blinding an access control identifier.

The blinding techniques described above in Section III can be applied to a process for obtaining an access control token. The blinding process can help prevent the cryptographic process against side channel attacks. In this case, an access control identifier (which can be also known as a rate limit token), as described in Section II, can be blinded using information known only to the service client 502 on the electronic device. FIG. 5 illustrates a sequence diagram 500 for blinding an access control identifier.

Similar to the process in Section II, the service client 502 can generate an access control identifier (ACI). The access control identifier (ACI) can be a unique identifier. The ACI is not directly tied to the user or the electronic device. The access control identifier can be used to rate limit for a service while remaining anonymous. The ACI can be decoupled from any device identifier. The ACI can be periodically refreshed. In various embodiments, the ACI is not shared across devices. In various embodiments, the ACI can be generated per application (e.g., a podcast application, a music application). A rate limit token (RLT) can be an example of an access control identifier. The ACI can be generated by performing and encryption operation using a persistent secret bound to the device, such as a hardware encryption key, i.e., $enc2_{hwkey}$ (ACI_seed, srvID).

In various embodiments, the service client 502 can generate an access control identifier using a server-seeded value and client-specific secret. At 504, the service client 502 can generate a blinded access control identifier using an access control identifier and a randomness factor derived by the electronic device as the message M illustrated in the blinding process described for FIG. 4. The ACI can be encrypted using a token generating service public key (e.g., e and N when RSA is used), and blinded using a randomness factor r or cryptographic nonce. Blinding can make the request anonymous. The randomness factor r can be used an inverseable blinding factor that does not allow a token generating service 508 to determine the ACI, even after the request message has been decrypted using the token generating service's private key as the decrypted result is still blinded. The token generating service public key can sit on the server side and the public keys can be shared. The randomness factor r sits on client side and is not shared outside the client. In various embodiments, the randomness factor r can be generated using a seed and a service identifier, by performing an encryption using a device bound secret (such as a hardware encryption key or hardware key) e.g., $enc1_{hwkey}$ (r_seed, srvID).

At 506, the service client 502 can send the blinded, encrypted ACI with authenticating information to a verification server 508. In various embodiments, the authenticating information can be a client identifier (e.g., a mobile Internet device identifier (DeviceID) and/or a one-time passcode (OTP) or other types of authentication challenges). DeviceID can be used in circumstances it is desirable for the DeviceID to be associated with one device as opposed to an account specific one that can be associated with various devices. In various embodiments, other methods of authenticating can be used as long there is an identifier that is tied to the device and/or a user and some sort of password authentication data that goes along with it. In some variations, the verification server 508 and the token server 515 are separate computing devices. In some variations, the verification server 508 and the token server 515 are software modules running on a same computing device. However, the processes described herein with respect to the verification server 508 and the token server 515 can be performed by any suitable combination of hardware and software components.

The verification server 508 can receive the blinded, encrypted ACI from the service client 502. A service provider can validate the authentication challenge to a user after the user pays for the service. The DeviceID can be a hardware identifier, but it could be a user ID or something that the token generating service 508 can verify.

At 510, the verification server 508 can verify the authenticating information (data) (e.g., the DeviceID and/or the authentication challenge). The verification can be performed by matching the authentication information to known data, e.g., in a database. For instance, the DeviceID can already be registered with token generating service 508, e.g., from previous requests for different services. Any passwords (or authentication challenge) can be received form a service provider via a separate communication channel, which can communicate a client identifier (e.g., an DeviceID/Authentication Challenge) to token generating service 508.

The client identifier (e.g., DeviceID/Authentication Challenge) can be used to prevent fraudulent devices (e.g., a server farm) from making too many requests to the token generating service 508. The verification server 508 can use a database store to ensure that for any DeviceID received there will be only one entry. In that way if a second request is received by the verification server 508 with the same DeviceID, the verification server 508 can indicate that a mapping exists for the DeviceID already and reject the request for the second request with the same DeviceID.

The verification server 508 can decrypt (using a token generating service private decryption key d) the blinded, encrypted ACI to obtain the blinded ACI. Since the ACI is blinded, the verification server 508 cannot associate the ACI with the authenticating information, and thus not with a particular user, device, or account.

The verification server 508 can sign the blinded ACI with a token generating service private key to create a signed and blinded ACI. The blinded signature can be used for a one-time use case and then deleted. In examples, the verification server 508 can store the DeviceID to a memory along with the blinded signature. Because the ACI is blinded, the token server cannot recover the unblind version since it does not have access to the randomness factor r.

At 512, the verification server 508 can send the signed and blinded ACI to the service client 502. The service client 502 can receive the signed and blinded ACI.

At 513, the service client 502 can unblind the signed and blinded ACI to obtain an ACI signature. In various embodiments, the randomness factor r can be used to unblind the signed and blinded ACI, denoted as r_inv in FIG. 5. In this way, the service client 502 has now has a signed ACI, but without divulging the ACI so that the user cannot be tracked by the ACI.

At 514, the service client 502 can send the ACI and the ACI signature to a token server 515 (e.g., token generating service). The token server 515 can receive the signed ACI. The token server 515 can verify the access control identifier signature using the access control identifier and a token server public key, e.g., to ensure that the signature has not been tampered with and was validly issued. The token server 515 may obtain the ACI at this stage, but the token server 515 cannot associate the ACI with any particular user or device. The token server 515 can just determine that the signature was validly generated previously.

If the signature for the ACI is verified, the token server 515 can create a service token (e.g., a JSON Web Token (JWT)). The service token can be a protocol that can be used for rate limiting and API access. In various embodiments, the service token can include the ACI as the payload.

At 516, the token server 515 can send the service token with the ACI as payload to the service client 502. The service client 502 can receive the service token with the ACI as payload.

At 520, the service client 502 can send the service token with the ACI to the service gateway 518. In various embodiments, the service token can be used for rate limiting. For rate limiting, the service gateway 518 can hold back the service for a certain delay. In various embodiments, the service gateway 518 can filter out the service request if a threshold has been exceeded. In various embodiments, the service gateway 518 can determine whether to, how, and when to send out a request to a destination. The service gateway 518 can receive the service token with the ACI. Based on a predetermined criterial, at 522, the service gateway 518 can rate limit the service. For example, after a predetermined number of downloads for a particular service token the service gateway 518 can prevent further downloads of the media file (e.g., a podcast) for a particular ACI.

V. Exemplary Key Rotation

An objective of the technique is to ensure that no profiling is being conducted of the exchange between the service client 506 and the token generating service 508 so the keys are not compromised. Therefore, a key rotation can be established for rotating the publicly seeded values for the ACI as well as the token signatures (e.g., the service token). In various embodiments, the time span can be for a period of time (e.g., three months) to allow for fewer requests to be processed by the token generating service 508 but frequent enough that a fraudster will not succeed in decrypting what is done with the signature or anything to that extent.

Figure 6:
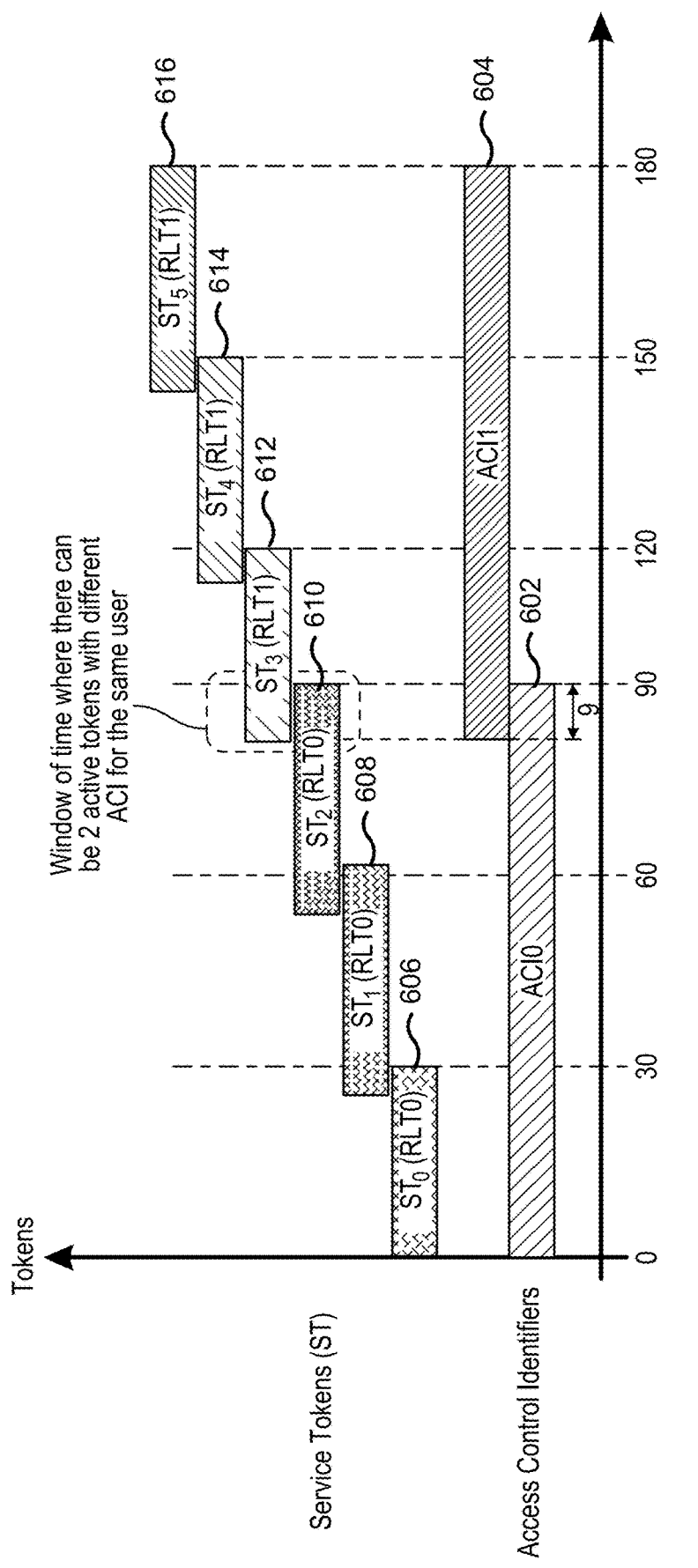
FIG. 6 illustrates an exemplary schedule for rotating keys for an access control system.

FIG. 6 illustrates a key rotation graph 600 for rotating keys for an access control system. As shown in FIG. 6, the x-axis can be time (in days). The y-axis can illustrate various identifiers or tokens (e.g., ACI or service tokens (ST)) that are active. By having an overlap for a short period of time allows users with the old tokens to continue to access services for a short period of time while notifying the user to update their credentials. At the same time, in various embodiments, there can be an overlapping period for both the ACI and service token. During the overlapping period, both the expiring service token and the new service token can be active. The overlapping period can be for a predetermined number of days (e.g., 9 days). In various embodiments, the signature can use a 3K RSA to prevent fraudsters breaking protocol. The technique can rotate keys periodically (e.g., every 3 months). The keys can include r_seed, ACI_seed, signer keys. For example, ACI0 602 can be active from 0 to 90 days and ACI1 604 can be active from day 81 to day 180. $ST_0$ 606 can be active from day 0 to day 30, $ST_1$ 608 can be active from day 21 to day 60, $ST_2$ 610 can be active from day 51 to day 90, $ST_3$ 612 can be active from day 81 to day 120, $ST_4$ 614 can be active from day 111 to day 150, and $ST_5$ 616 can be active from day 141 to day 180.

VI. Using Jitter Between Responses and Private Channels to Defeat Signal Correlation Blinding the access control identifier is one way to protect the process. However, some vulnerabilities may still exist, especially if the signals are being observed. In various embodiments, the techniques have a series of requests close in time using the same Internet Protocol (IP) address. Fraudulent actors may be able to determine who the user based on these requests being close in time. Fraudulent actors may be able to correlate which ACI originated from a particular DeviceID.

Figure 7:
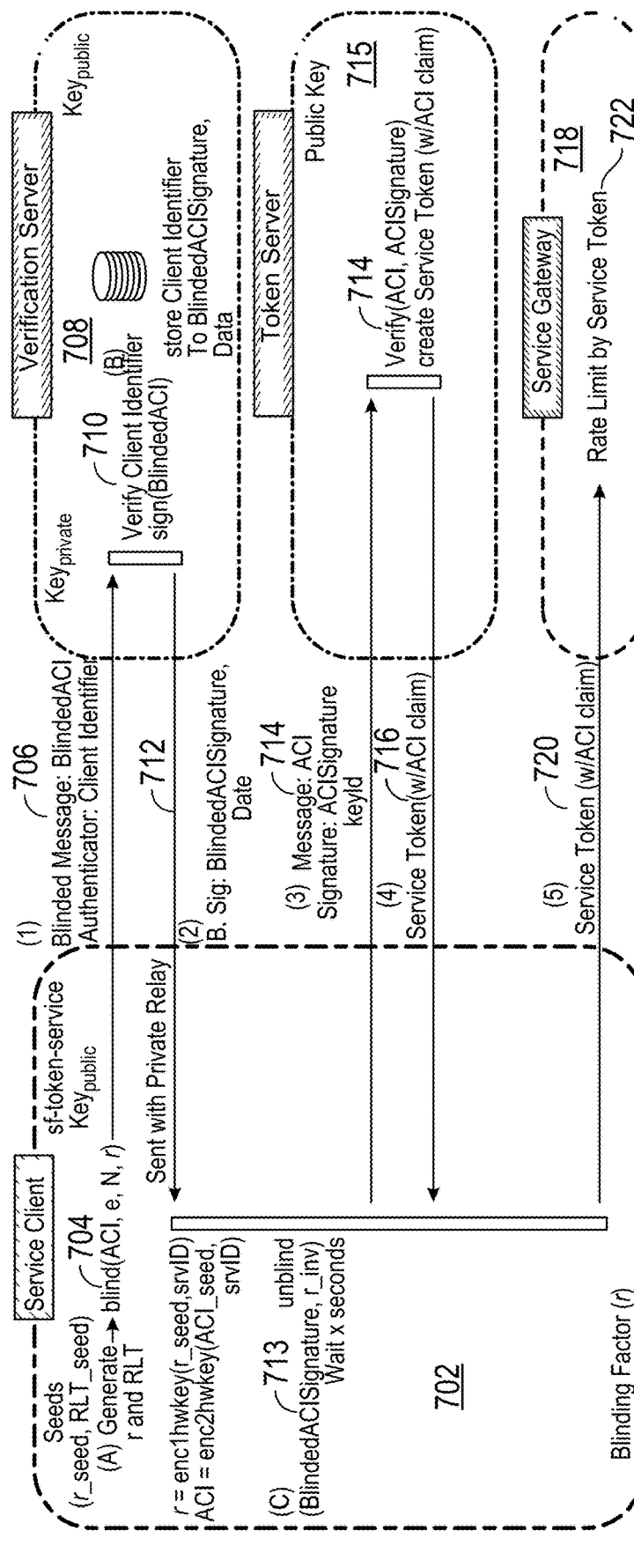
FIG. 7 illustrates a sequence diagram for an overall rate limiting protocol.

FIG. 7 illustrates a second exemplary sequence diagram 700 for an overall rate limiting protocol. Using the previously described techniques the request for signature and the request for the service token can be conducted in sequence. Since the request for the signature and the request for the service token can be made close in time, it may be possible to relate the client identifier (e.g., DeviceID) to the ACI in using tools that analyzes machines data for identifying data patterns (e.g., Splunk).

In various embodiments, jitter can be added between the requests to avoid time-based correlation. Jitter can be a deviation from true periodicity from a periodic signal, often in relation to a reference clock signal. Jitter can be added in the form of delay before the response is provided.

In various embodiments, the techniques can add virtual private network (VPN) or other mechanisms such as iCloud private relay to hide the Internet Protocol (IP) address of the requesting device.

At 704, the service client 702 can generate a blinded access control identifier (ACI) using an access control identifier and a randomness factor derived by the electronic device as the message M illustrated in the blinding process described for FIG. 5. In various embodiments, the service client 702 can generate an access control identifier using a server-seeded value and client-specific secret. The ACI can be encrypted using a token generating service public key (e.g., e and N when RSA is used), and blinded using a randomness factor r or cryptographic nonce. Blinding can make the request anonymous. The randomness factor r can be used an inverse-able blinding factor that does not allow a token generating service 508 to determine the ACI, even after the request message has been decrypted using the token generating service's private key as the decrypted result is still blinded. The token generating service public key can sit on the server side and the public keys can be shared. The randomness factor r sits on client side and is not shared outside the client. In various embodiments, the randomness factor r can be generated using a seed and a service identifier, for example by performing an encryption using a device bound secret such as an encryption hardware key e.g., $enc1_{hwkey}$ (r_seed, srvID).

At 706, the service client 702 can send the blinded ACI with authenticating information to the verification server 708. In various embodiments, the blinded ACI can be sent with a private relay to the verification server 708. In various embodiments, the authenticating information can be mobile Internet device identifier (DeviceID) and/or a one-time passcode (OTP) and/or authentication challenge. DeviceID can be used in circumstances it is desirable for the DeviceID to be associated with one device as opposed to an account specific one that can be associated with various devices. In various embodiments, other methods of authenticating can be used as long there is an identifier that is tied to the device and/or a user and some sort of password authentication data that goes along with it. In some variations, the verification server 708 and the token server 715 are separate computing devices. In some variations, the verification server 708 and the token server 715 are software modules running on a same computing device. However, the processes described herein with respect to the verification server 708 and the token server 715 can be performed by any suitable combination of hardware and software components.

The verification server 708 can receive the blinded, encrypted ACI from the service client 702. A service provider can provide the authentication challenge to a user after the user pays for the service. The DeviceID can be a hardware identifier, but it could be a user ID or something that the verification server 708 can verify.

At 710, the verification server 708 can verify the authenticating information (e.g., the DeviceID and/or the authentication challenge). The verification can be performed by matching the authentication information to known data, e.g., in a database. For instance, the DeviceID can already be registered with verification server 708, e.g., from previous requests for different services. Any passwords (or authentication challenge) can be received form a service provider via a separate communication channel, which can communication a client identifier (e.g., DeviceID/authentication challenge) to verification server 708.

The DeviceID and authentication challenge can be used to prevent fraudulent devices (e.g., a server farm) from making too many requests to the verification server 708. The verification server 708 can use a database store to ensure that for any DeviceID received there will be only one entry. In that way if a second request is received by the verification server 708 with the same DeviceID, the verification server 708 can indicate that a mapping exists for the DeviceID already and reject the request for the second request with the same DeviceID.

The verification server 708 can sign the blinded ACI with a verification server private key to create a signed and blinded ACI. The blinded signature can be used for a one-time use case and then deleted. In examples, the verification server 708 can store the MID to a memory along with the blinded signature. Because the ACI is blinded, the token server cannot recover the unblind version since it does not have access to the randomness factor r.

At 713, the service client 702 can unblind the signed and blinded ACI. In various embodiments, the randomness factor r, specifically r_inv, can be used to unblind the signed and blinded ACI. In this way, the service client 702 has now has a signed ACI. In various embodiments, the encrypted values can be persistent and seeded with three values: device hardware key (for device uniqueness), public seed (for server-side refreshes), and serviced (for per App. uniqueness).

In various embodiments, following the receipt of the signed and blinded ACI, the service client 702 can wait a predetermined amount of time (e.g., a few seconds) prior to sending a signed ACI to a token server 715.

At 714, the service client 702 can send a signed ACI to a token server 715. The token server 715 can receive the signed ACI. The token generating service 508 can verify the signature using the token generating service public key, e.g., to ensure that the signature has not been tampered with and was validly issued. Token generating service 508 may obtain the ACI at this stage, but token generating service 508 cannot associate the ACI with any particular user or device. Token generating service 508 can just determine that the signature was validly generated previously.

If the signature for the ACI is verified, the token generating service 508 can create a service token (e.g., JSON Web Token (JWT)). The service token (e.g., a JWT) can be a protocol that can be used for rate limiting and API access. In various embodiments, the service token can include the ACI as the payload.

At 716 the service client 702 can send the service token with the ACI to the service gateway 718. The service gateway 718 can receive the service token with the ACI.

At 720, the service client 702 can send the service token with the ACI to the service gateway 718. In various embodiments, the service token can be used for rate limiting. For rate limiting, the service gateway 718 can hold back the service for a certain delay. In various embodiments, the service gateway 718 can filter out the service request if a threshold has been exceeded. In various embodiments, the service gateway 718 can determine whether to, how, and when to send out a request to a destination. The service gateway 718 can receive the service token with the ACI. Based on a predetermined criterial, at 722, the service gateway 718 can rate limit the service. For example, after a predetermined number of downloads for a particular service token the service gateway 718 can prevent further downloads of the media file (e.g., a podcast).

VII. Exemplary Flow Diagram

Figure 8:
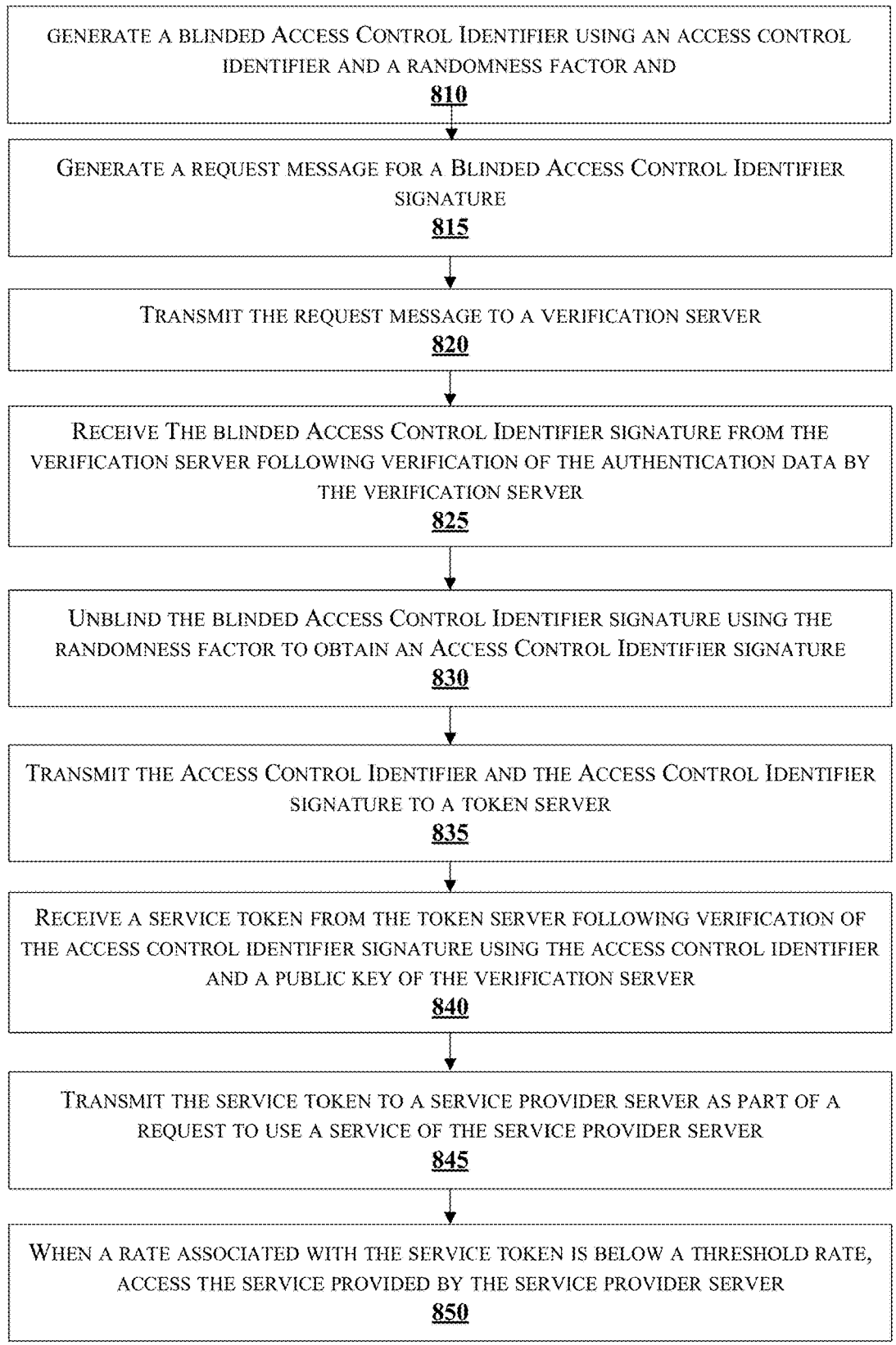
FIG. 8 illustrates a flowchart illustrating a method for anonymous rate limiting.

FIG. 8 illustrates a flowchart illustrating a method for anonymous rate limiting. FIG. 8 is a flow chart of a process 800, according to an example of the present disclosure. According to an example, one or more process blocks of FIG. 8 may be performed by an electronic device.

At block 810, process 800 can include generating a blinded access control identifier by blinding an access control identifier using a randomness factor r. The randomness factor can be derived by the electronic device. The process of block 810 is also described as step 704 for FIG. 7. For example, electronic device may in connection with a request for a service, generate a blinded access control identifier by blinding an access control identifier using a randomness factor, as described above. The blinding may be performed by a service client operating on the electronic device. The randomness factor r can be stored on client side and is not shared outside the client.

The access control identifier can include a unique, anonymous identified identifier generated by the electronic device.

In various embodiments, process 800 can include generating an access control identifier using a server-seeded value and client-specific secret.

The ACI can be encrypted using a token generating service public key (e.g., e and N when RSA is used), and blinded using a randomness factor r or cryptographic nonce. Blinding can make the request anonymous. The randomness factor r can be used an inverse-able blinding factor that does not allow a token generating service 508 to determine the ACI, even after the request message has been decrypted using the token generating service's private key as the decrypted result is still blinded. The token generating service public key can sit on the server side and the public keys can be shared. The randomness factor r sits on client side and is not shared outside the client.

At block 815, process 800 may include generating a request message for a blinded access control identifier signature, the request message may include the blinded access control identifier and authentication data. The process of block 810 is also described as step 704 for FIG. 7. For example, electronic device may generate a request message for an access control identifier signature, the request message may include the blinded access control identifier and authentication data, as described above. The access control identifier can also be encrypted.

In various embodiments, the authenticating information can be mobile Internet device identifier (DeviceID) or a one-time passcode (OTP) or an authentication challenge. DeviceID can be used so the DeviceID is associated with one device as opposed to an account specific one that can be associated with various devices. In various embodiments, other methods of authenticating can be used if it has an identifier that is tied to the device and/or a user and some sort of password authentication data that goes along with it. The verification server (e.g., token server) can receive the blinded access control identifier from the service client via a wired or wireless protocol.

A service provider can provide the authentication challenge to a user after the user pays for the service. The DeviceID can be a hardware identifier, but it could be a user ID or something that the token generating service can verify.

At block 820, process 800 may include transmitting the request message to a verification server. The process of block 820 is also described as step 706 for FIG. 7. For example, electronic device may transmit the request message to a verification server, as described above. The transmitting can be performed using wired or wireless means. The transmitting can be done using various different protocols. In various embodiments, the transmitting can be done using a network (e.g., the Internet). In some variations, the verification server and the token server are separate computing devices. In some variations, the verification server and the token server are software modules running on a same computing device. However, the processes described herein with respect to the verification server and the token server can be performed by any suitable combination of hardware and software components.

The verification server can receive the request message containing the blinded access control identifier and the authentication data. The verification server can verify the authentication data (e.g., DeviceID and/or the authentication challenge). The DeviceID and authentication challenge can be used to prevent fraudulent devices (e.g., a server farm) from making too many requests to the verification server. The verification server can use a database store to ensure that for any DeviceID received there will be only one entry. In that way if a second request is received by the verification server with the same DeviceID, the verification server can indicate that a mapping exists for the DeviceID already and reject the request for the second request with the same DeviceID. In various embodiments, the authentication data may include a device identifier.

After authentication has been accomplished, the verification server can sign the blinded access control identifier (e.g., using the public key for the verification server). The verification server can send the signed access control identifier back to the service client.

At block 825, process 800 may include receiving a blinded access control identifier signature message from the verification server following verification of the authentication data by the verification server. The process of block 825 is also described as step 713 for FIG. 7. For example, electronic device may receive a blinded access control identifier signature message from the verification server following verification of the authentication data by the verification server, as described above.

At block 830, process 800 may include unblinding the blinded access control identifier signature message using the randomness factor to obtain the access control identifier signature. The process of block 830 is also described as step 713 for FIG. 7. For example, electronic device may unblind the blinded access control identifier signature message using the randomness factor to obtain the access control identifier signature, as described above. The unblinded signature message can be stored in the memory of the electronic device.

At block 835, process 800 may include transmitting the access control identifier and the access control identifier signature to the token server. The process of block 835 is also described as step 714 for FIG. 7. For example, electronic device may transmit the access control identifier and the access control identifier signature to the token server, as described above. The transmitting can be accomplished using a wired or wireless protocol. The transmitting can be performed over a network (e.g., an Internet).

The token server can verify the signature using the token server public key. If the signature for the signed access control identifier is verified, the token server can create a service token (e.g., JSON Web Token (JWT)). The service token can be a protocol that can be used for rate limiting and API access. In various embodiments, the service token can include the ACI as the payload.

The token server can send the service token (e.g., the JWT) with the access control identifier (e.g., a rate limit token) as payload to the service client. The service client can receive the service token. In various embodiments, the service client can store the service token in a memory.

At block 840, process 800 may include receiving a service token from the token server following verification of the rate limit token using the access control identifier signature and a public key of the verification server, the service token may include the access control identifier as a payload. The process of block 840 can also described as step 713 for FIG. 7. For example, electronic device may receive a service token from the token server following verification of the access control identifier using the access control identifier signature and a public key of the token server, the service token may include the rate limit token as a payload, as described above.

In various embodiments, process 800 may include adding jitter between the request message for the signed rate limit token and the request message for the service token to avoid time-based correlation. By waiting for a variable rate of time between sending the request message for the signed rate limit token and the request message for the service token it may be difficult for nefarious actors to correlate the two messages. The closer in time the messages are transmitted the more likely correlation will occur. By adding jitter between the transmissions, the likelihood of correlation the messages can be reduced.

At block 845, process 800 may include transmitting the service token to a service provider server as part of a request to use the service of the service provider server. The process of block 845 is also described as step 720 for FIG. 7. For example, electronic device may transmit the service token to a service provider server as part of a request to use the service of the service provider server, as described above. In various embodiments, the service token can be sent to a gateway service.

At block 850, process 800 may include when a rate associated with the service token is below a threshold rate, accessing the service provided by the service provider server. The process of block 850 is also described as step 722 for FIG. 7. For example, electronic device may when a rate associated with the service token is below a threshold rate, access the service provided by the service provider service, as described above. In various embodiments, a service server can process the request if the service token is provided. In various embodiments, the service token is a JSON Web Token.

Process 800 may include additional implementations, such as any single implementation or any combination of implementations described below and/or in connection with one or more other processes described elsewhere herein. In a first implementation, the rate limit token may include a unique, anonymous identifier of the electronic device generated on a client side.

In various embodiments, the access control identifier and the service token can be rotated periodically. In various embodiments, the period can be predetermined period of time. In various embodiments, the period can be a predetermined number of days. In various embodiments, there can be an overlap period-in-time (e.g., days) between an expiring access control identifier and service token. During the overlap period, both the expiring token and the new token would work.

In various embodiments, process 800 may include transmitting the request message to the verification server comprises transmitting the request message to the verification server via a private relay.

It should be noted that while FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

VIII. Example Device

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Figure 9:
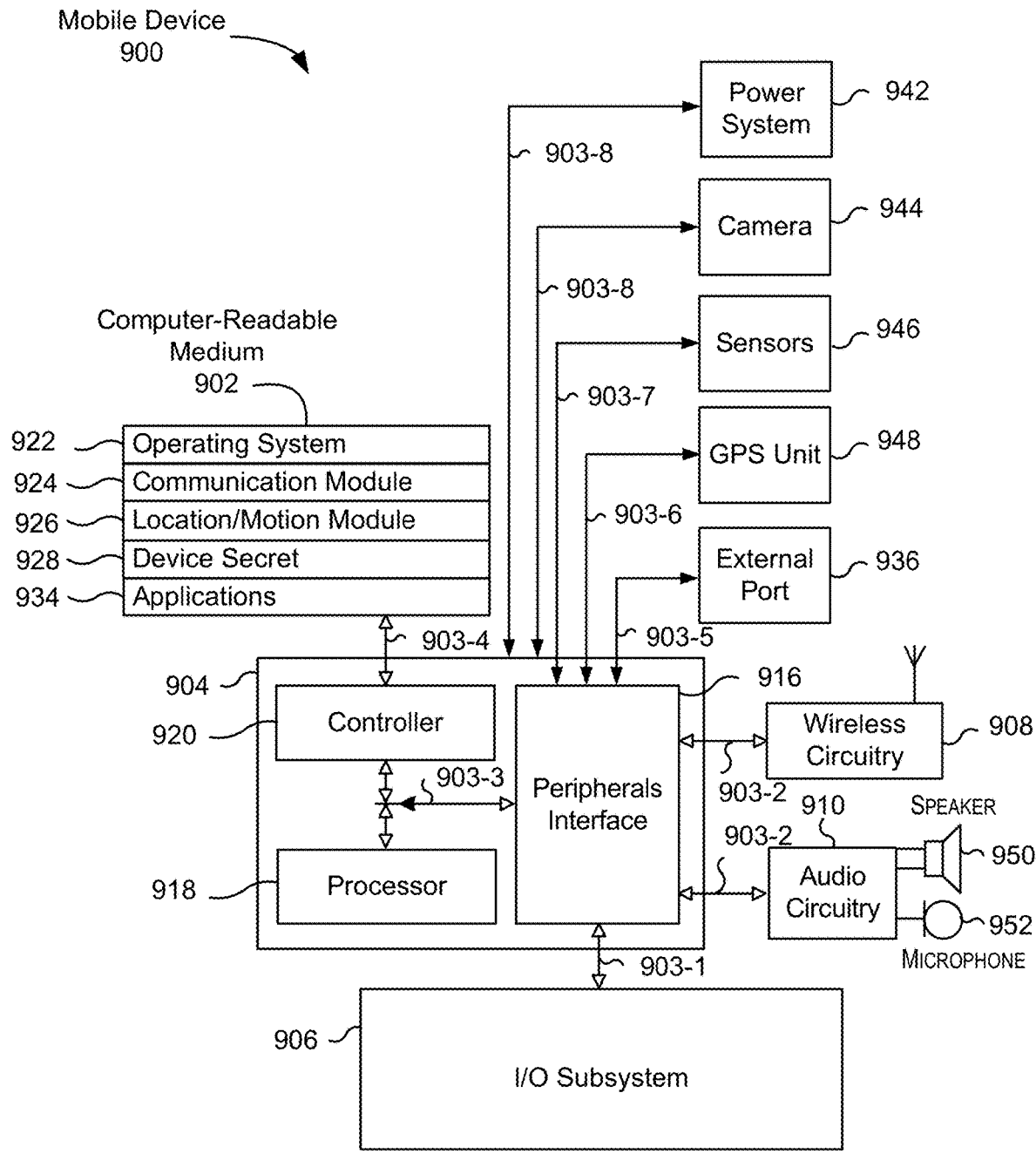
FIG. 9 is block diagram of an example device according to embodiments of the present disclosure.

FIG. 9 is a block diagram of an example of an architecture of an electronic device 900 in which the present disclosure can be implemented. Device 900 generally includes computer-readable medium 902, a processing system 904, an Input/Output (I/O) subsystem 906, wireless circuitry 908, and audio circuitry 910 including speaker 912 and microphone 914. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 908 can use various protocols, e.g., as described herein. In various embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 908 is coupled to processing system 904 via peripherals interface 916. Peripherals interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of device 900 to the one or more processors 918 and computer-readable medium 902. One or more processors 918 communicate with computer-readable medium 902 via a controller 920. Computer-readable medium 902 can be any device or medium that can store code and/or data for use by one or more processors 918. Computer-readable medium 902 can include a memory hierarchy, including cache, main memory, and secondary memory. The memory hierarchy can be implemented using any combination of random-access memory (RAM) (e.g., static random-access memory (SRAM,) dynamic random-access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 916, one or more processors 918, and controller 920 can be implemented on a single chip, such as processing system 904. In some other embodiments, they can be implemented on separate chips.

Processor(s) 918 can include hardware and/or software elements that perform one or more processing functions, such as mathematical operations, logical operations, data manipulation operations, data transfer operations, controlling the reception of user input, controlling output of information to users, or the like. Processor(s) 918 can be embodied as one or more hardware processors, microprocessors, microcontrollers, field programmable gate arrays (FPGAs), application-specified integrated circuits (ASICs), or the like.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)), and any other components typically associated with the generation, management, and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module 924 (or set of instructions), a location module 926 (or set of instructions), a device secret 928 that is used as part of ranging operation described herein, and other application programs 934 (or set of instructions).

Operating system 922 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 926 can assist in determining the current position (e.g., coordinates or other geographic location identifiers) and motion of device 900. Modern positioning systems include satellite-based positioning systems, such as Global Positioning System (GPS), cellular network positioning based on "cell IDs," and Wi-Fi positioning technology based on a Wi-Fi network. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data Device 900 can include a client persisted value stored as a device secret 928. The device secret 928 can be known as a hardware key (hwkey). The device secret 928 is not disclosed to the token generating service 108 can be used for the purpose of regenerating the same value in a window of time controlled by the server.

The one or more applications 934 on device 900 can include any applications installed on the device 900, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating, and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use light emitting diode (LED), liquid crystal display (LCD) technology, or light emitting polymer display (LPD) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 906 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted being prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by an electronic device, the method comprising:
   generating a blinded access control identifier using an access control identifier and a randomness factor derived by the electronic device;
   generating a request message for a blinded access control identifier signature, the request message comprising the blinded access control identifier and authentication data;
   transmitting the request message to a verification server;
   receiving the blinded access control identifier signature from the verification server following verification of the authentication data by the verification server;
   unblinding the blinded access control identifier signature using the randomness factor to obtain an access control identifier signature;
   transmitting the access control identifier and the access control identifier signature to a token server;
   receiving a service token from the token server following verification of the access control identifier signature using the access control identifier and a public key of the verification server, the service token comprising the access control identifier as a payload;
   transmitting the service token to a service provider server as part of a request to use a service of the service provider server; and
   when a rate of requests associated with the service token is below a threshold rate, accessing the service provided by the service provider server.

2. The method of claim 1, wherein the access control identifier comprises a unique, anonymous identifier generated by the electronic device.

3. The method of claim 1, wherein the access control identifier and the service token are rotated periodically with an overlapping window.

4. The method of claim 1, further comprising adding jitter between the request message for the blinded access control identifier signature and the request message for the service token to avoid time-based correlation.

5. The method of claim 1, wherein transmitting the request message to the verification server comprises transmitting the request message to the verification server via a private relay.

6. The method of claim 1, wherein the authentication data comprises a device identifier.

7. The method of claim 1, wherein the service token is a JSON Web Token.

8. The method of claim 1, further comprising encrypting the request message using the public key of the verification server.

9. The method of claim 1, wherein the verification server is the token server.

10. The method of claim 1, further comprising generating the access control identifier using a server-seeded value and client-specific secret.

11. A computing device, comprising:
    one or more memories; and
    one or more processors in communication with the one or more memories and configured to execute instructions stored in the one or more memories to performing operations comprising:
       generating a blinded access control identifier using an access control identifier and a randomness factor derived by the computing device;
       generating a request message for a blinded access control identifier signature, the request message comprising the blinded access control identifier and authentication data;
       transmitting the request message to a verification server;
       receiving the blinded access control identifier signature from the verification server following verification of the authentication data by the verification server;
       unblinding the blinded access control identifier signature using the randomness factor to obtain an access control identifier signature;
       transmitting the access control identifier and the access control identifier signature to a token server;
       receiving a service token from the token server following verification of the access control identifier signature using the access control identifier and a public key of the verification server, the service token comprising the access control identifier as a payload;
       transmitting the service token to a service provider server as part of a request to use a service of the service provider server; and
       when a rate of requests associated with the service token is below a threshold rate, accessing the service provided by the service provider server.

12. The computing device of claim 11, wherein the access control identifier comprises a unique, anonymous identifier generated by the computing device.

13. The computing device of claim 11, wherein the access control identifier and the service token are rotated periodically with an overlapping window.

14. The computing device of claim 11, wherein the operations further comprise adding jitter between the request message for the blinded access control identifier signature and the request message for the service token to avoid time-based correlation.

15. The computing device of claim 11, wherein transmitting the request message to the verification server comprises transmitting the request message to the verification server via a private relay.

16. The computing device of claim 11, wherein the authentication data comprises a device identifier.

17. The computing device of claim 11, wherein the service token is a JSON Web Token.

18. The computing device of claim 11, wherein the operations further comprise encrypting the request message using the public key of the verification server.

19. The computing device of claim 11, wherein the verification server is the token server.

20. A non-transitory computer readable medium storing a set of instructions that when executed by one or more processors of a computing device, cause the computing device to perform operations comprising:
    generating a blinded access control identifier using an access control identifier and a randomness factor derived by the computing device;
    generating a request message for a blinded access control identifier signature, the request message comprising the blinded access control identifier and authentication data;
    transmitting the request message to a verification server;
    receiving the blinded access control identifier signature from the verification server following verification of the authentication data by the verification server;
    unblinding the blinded access control identifier signature using the randomness factor to obtain an access control identifier signature;

transmitting the access control identifier and the access control identifier signature to a token server;

receiving a service token from the token server following verification of the access control identifier signature using the access control identifier and a public key of the verification server, the service token comprising the access control identifier as a payload;

transmitting the service token to a service provider server as part of a request to use a service of the service provider server; and when a rate of requests associated with the service token is below a threshold rate, accessing the service provided by the service provider server.

* * * * *